(12) United States Patent
Suzuki

(10) Patent No.: US 8,542,373 B2
(45) Date of Patent: Sep. 24, 2013

(54) IMAGE PROCESSING APPARATUS AND SHEET DIVERTING METHOD

(75) Inventor: Katsunori Suzuki, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 256 days.

(21) Appl. No.: 13/169,120

(22) Filed: Jun. 27, 2011

(65) Prior Publication Data

US 2011/0317198 A1    Dec. 29, 2011

Related U.S. Application Data

(60) Provisional application No. 61/359,452, filed on Jun. 29, 2010, provisional application No. 61/434,895, filed on Jan. 21, 2011.

(51) Int. Cl.
*G06F 15/00* (2006.01)
*G06F 3/12* (2006.01)
*G06K 1/00* (2006.01)

(52) U.S. Cl.
USPC .......................................... 358/1.13; 358/1.1

(58) Field of Classification Search
None
See application file for complete search history.

(56) References Cited

U.S. PATENT DOCUMENTS

| 2009/0154970 A1* | 6/2009 | Yoshida et al. ............... 399/341 |
| 2010/0118361 A1 | 5/2010 | Iguchi |
| 2011/0222131 A1* | 9/2011 | Yahata et al. ................. 358/452 |

* cited by examiner

*Primary Examiner* — Douglas Tran
(74) *Attorney, Agent, or Firm* — Turocy & Watson, LLP

(57) ABSTRACT

According to one embodiment, an image processing apparatus includes: plural trays; a reading section configured to convert an image formed on a sheet into image data and cause a storing section to store the image data; an erasing section configured to erase the image formed on the sheet; and a control section configured to acquire the image data from the storing section, determine, using the image data, whether a trace of a staple is present on the sheet, and convey the sheet, from which the image is erased by the erasing section, to any one of the plural trays such that a conveying destination is different according to a determination result.

20 Claims, 15 Drawing Sheets

Fig. 4
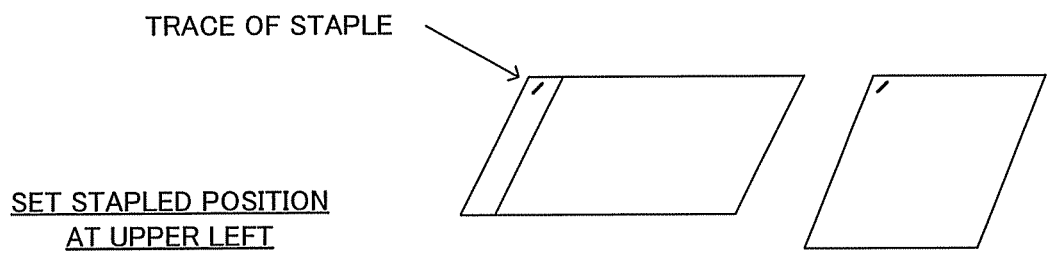
TRACE OF STAPLE
SET STAPLED POSITION
AT UPPER LEFT
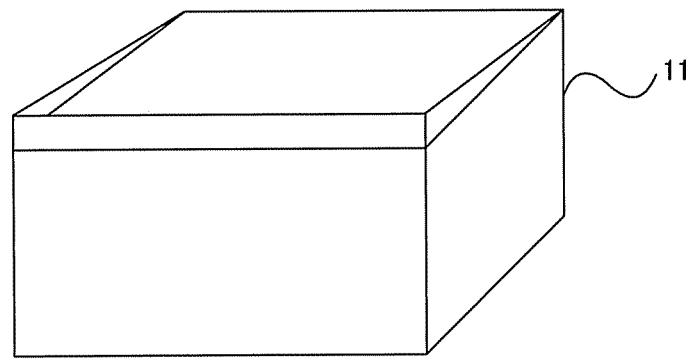

Fig. 10
| | FRONT | REAR |
|---|---|---|
| PAPER PATTERN |  |  |
| NUMBER OF TIMES OF ERASING | 1 | 2 |
| STAPLE REGION | a (LEFT END REGION) | c' (RIGHT END REGION) |
| NUMBER OF TIMES IN THE REGION | 1 | 1 |
| STAPLE PLACE | a (UPPER LEFT END) | b' (UPPER RIGHT END) |
| NUMBER OF TIMES IN THE PLACE | 1 | 1 |

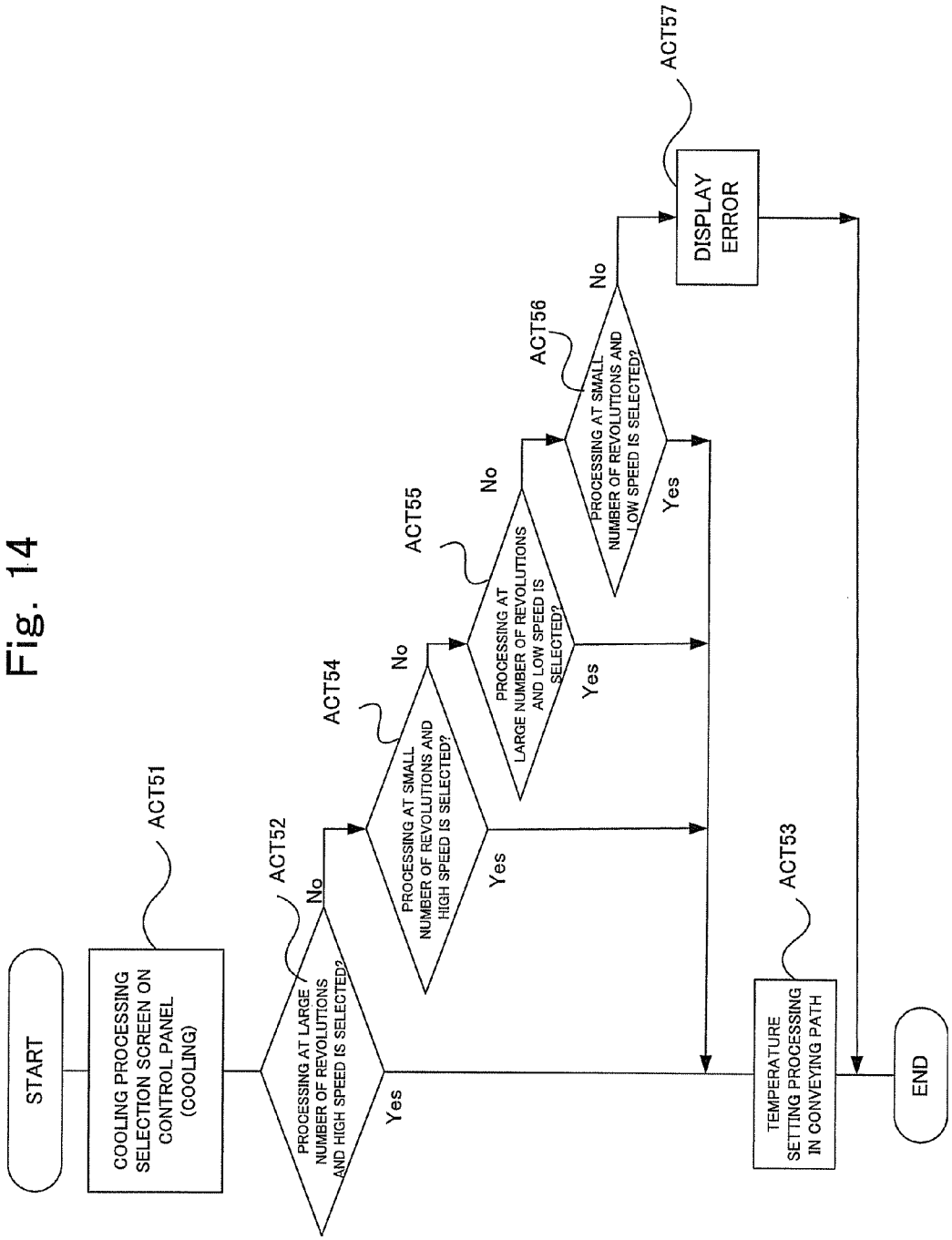

IMAGE PROCESSING APPARATUS AND SHEET DIVERTING METHOD

CROSS-REFERENCE TO RELATED APPLICATIONS

This application is based upon and claims the benefit of priority from: U.S. provisional application 61/359,452, filed on Jun. 29, 2010; U.S. provisional application 61/434,895, filed on Jan. 21, 2011; the entire contents all of which are incorporated herein by reference.

FIELD

Embodiments described herein relate generally to a technique of an image processing apparatus for erasing an image on a sheet.

BACKGROUND

In the past, in order to reuse a printed sheet, there is an erasing apparatus that prints an image using special ink or toner and erases the printed image through heat treatment or the like.

Since there is a limit in the number of times of erasing of a print, the erasing apparatus in the past recognizes a printed sheet, counts the number of times of printing, and determines, in erasing an image, whether the sheet can be reused. The erasing apparatus in the past conveys the sheet to a ruse tray, a disposal tray, or a conveying path for disposal according to a result of the determination.

There is an image processing apparatus including a function of stapling plural sheets with staples after printing. The image processing apparatus is generally used in an office or the like.

If stapled sheets are reused, a person needs to remove the staples. If the person fails to remove the staples from the sheets, staple traces remain in the sheets or the sheets are torn. If such sheets are reused, in the erasing apparatus, when the sheets are conveyed one by one, for example, the sheet is caught (jammed). This causes an error. In some case, the sheets themselves are scratched and cannot be reused.

Even if the staples are removed neatly, if the same places or places near the places are stapled next time, a jam tends to occur.

A sheet from which an image is erased by heat treatment needs to be cooled. However, if the sheet is left untouched and naturally cooled, a cooling time is required and the sheet cannot be instantaneously used.

DESCRIPTION OF THE DRAWINGS

FIG. 4 is a diagram of an example of a direction in which a user sets a sheet on an ADF;

FIG. 10 is a diagram of an example of management information (a table) included in the image processing apparatus according to the third embodiment;

FIG. 14 is a flowchart for explaining an example of a setting operation of the image processing apparatus according to the third embodiment in cooling a sheet.

DETAILED DESCRIPTION

In general, according to one embodiment, an image processing apparatus includes: plural trays; a reading section configured to convert an image formed on a sheet into image data and cause a storing section to store the image data; an erasing section configured to erase the image formed on the sheet; and a control section configured to acquire the image data from the storing section, determine, using the image data, whether a trace of a staple is present on the sheet, and convey the sheet, from which the image is erased by the erasing section, to any one of the plural trays such that a conveying destination is different according to a determination result.

First Embodiment

Figure 1:
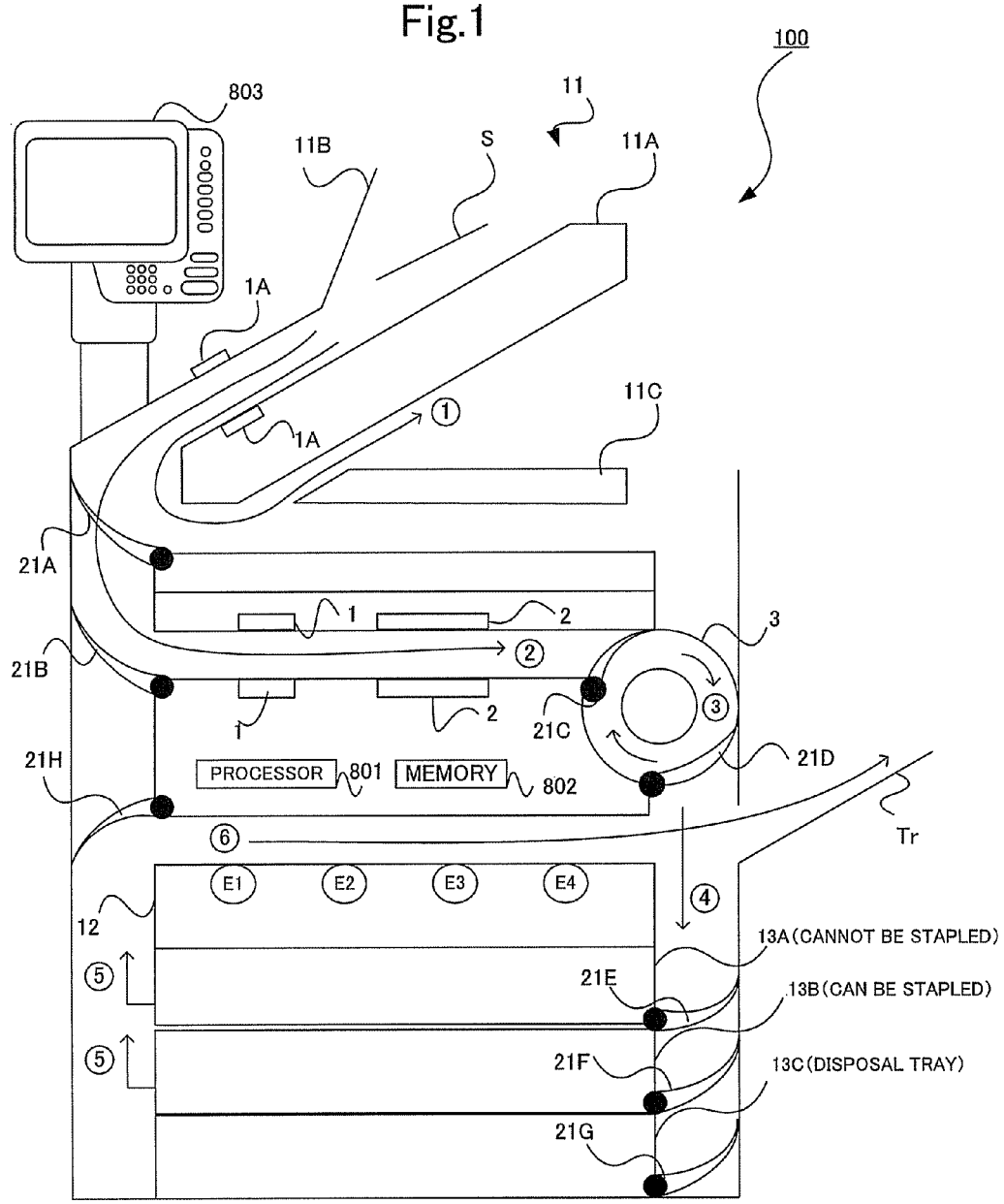
FIG. 1 is a diagram of a configuration example of an image processing apparatus according to an embodiment.

FIG. 1 is a longitudinal sectional view of a schematic configuration of an image processing apparatus according to a first embodiment. An image processing apparatus 100 is an MFP (Multi Function Peripheral) having a printing function, a scanner function, a facsimile transmitting and receiving function, a function of erasing an image formed on a sheet, and a function of cooling the sheet. The image processing apparatus 100 includes an ADF (Auto Document Feeder) 11 including units 11A to 11C, a reading section 1, a heat treatment section 2, an idle conveying section 3, and a printing section 12. The reading section 1 may be set in a place indicated by 1A. Depending on an arrangement configuration, a reading section configured to read an image of an original document during printing may be diverted as the reading section 1.

The image processing apparatus 100 includes switching guides 21A to 21H configured to rotate about a fulcrum indicated by a black circle in FIG. 1 and includes a processor 801, which is an arithmetic processing device such as a CPU (Central Processing Unit) or an MPU (Micro-Processing Unit). The image processing apparatus 100 includes a memory 802 including a volatile storage device such as a RAM (Random Access Memory) and a nonvolatile storage device such as a flash ROM (Read Only Memory) or a hard disk drive and a control panel 803 configured to receive an instruction from a user and displays setting information and a job progress state. The processor 801 collectively controls hardware on the inside of the image processing apparatus 100 and executes a computer program stored in the memory 802 in advance to realize various functions.

The image processing apparatus 100 is explained as including at least trays explained below. Besides the trays explained below, plural trays such as a tray in which new sheets are stored and trays in which sheets sorted according to positions of staple traces are stored are prepared.

A reuse tray 13A (a first tray) in which sheets that cannot be stapled during the next use are stored.

A reuse tray 13B (a second tray) in which sheets that can be stapled during the next use are stored.

A disposal tray 13C in which sheets to be disposed are stored.

Figure 2:
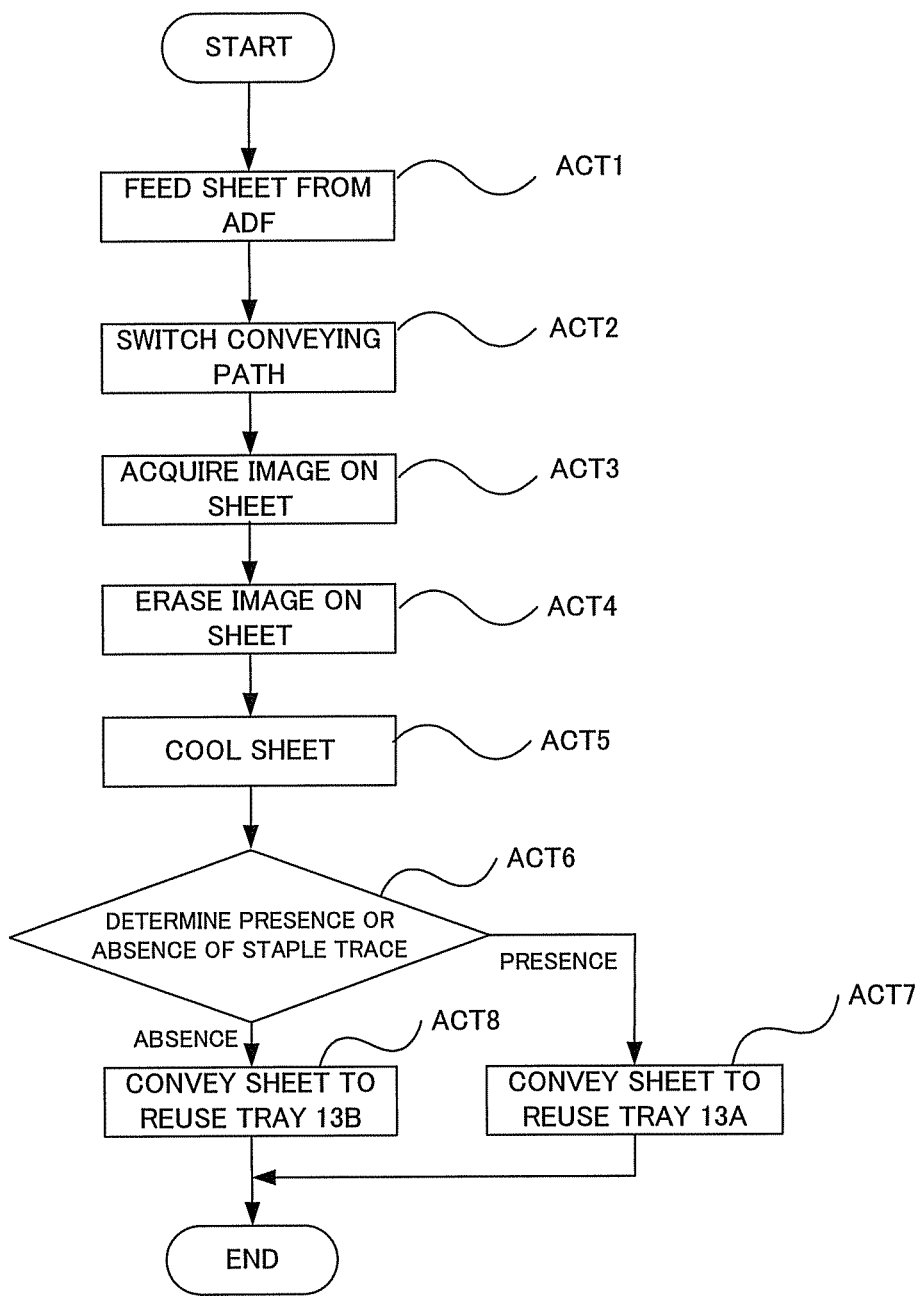
FIG. 2 is a flowchart for explaining an operation example during erasing in a first embodiment.
Figure 3:
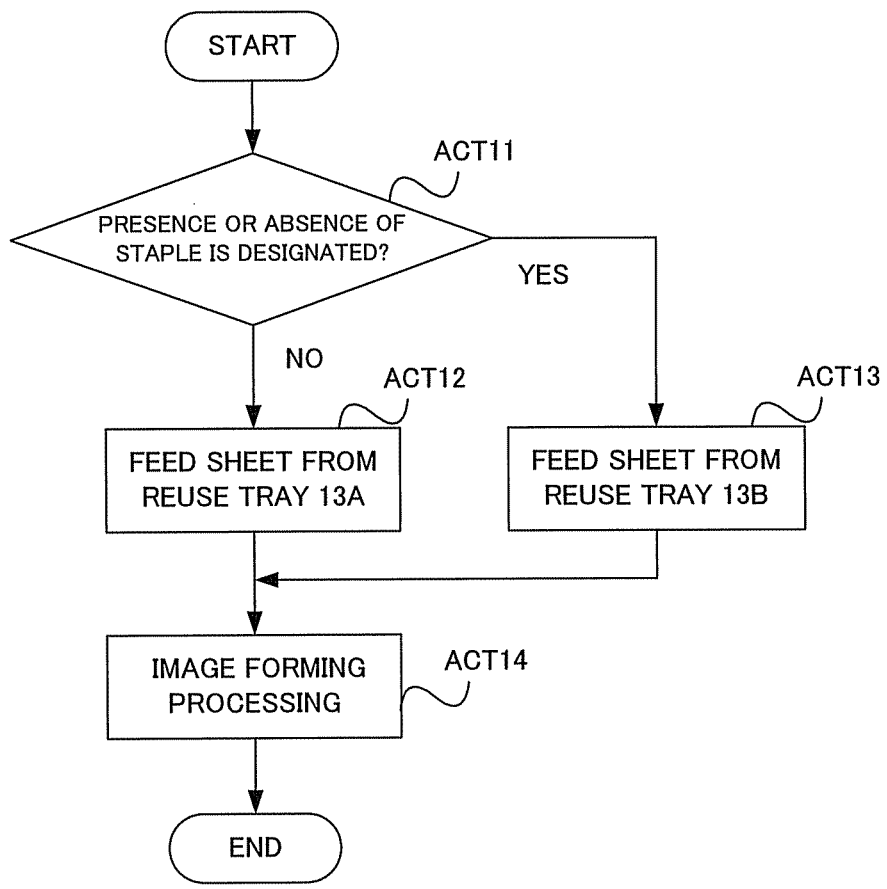
FIG. 3 is a flowchart for explaining an operation example during printing in the first embodiment.

Operations performed by using these units are explained with reference to FIGS. 2 and 3. First, an operation for diverting sheets to be reused is explained with reference to FIG. 2. If the processor 801 is an operation entity in flowcharts referred to below, it is assumed that the processor 801 operates by executing the computer program stored in the memory 802 in advance.

If staples are attached to sheets to be reused, the user removes the staples beforehand.

The user sets sheets S to be reused in the ADF 11 and presses a reuse button displayed on the control panel 803. The user adjusts the direction of sheets and the front and rear sides of the sheets to be set in directions determined beforehand, for example, sets a stapled position at the upper left as shown in FIG. 4.

The ADF 11 rotates a conveying roller and the like provided on the inside thereof to feed a sheet S to the inside of a main body of the image processing apparatus 100 (ACT 1).

The processor 801 determines whether the reuse button is pressed. If the reuse button is pressed, the processor 801 controls the switching guides 21A and 21B to set a conveying path for the sheet S in a direction of an arrow 2 shown in FIG. 1 (ACT 2). Specifically, the processor 801 controls the switching guide 21A such that the distal end of the switching guide 21A faces the upward direction. The processor 801 controls the switching guide 21B such that the distal end of the switching guide 21B faces the lateral direction comes down. In the case of a normal printing operation performed by using the ADF 11, the processor 801 controls the switching guide 21A such that the sheet S is conveyed in a direction of an arrow 1.

The reading section 1 includes a CCD sensor (Charge Coupled Device Image Sensor). The reading section 1 reads an image of the sheet S conveyed thereto and converts the image into imaging data (electronic image data) (ACT 3). When the image of the sheet S is read, both the front and rear sides of the sheet S are imaged. The imaging data is once stored in the memory 802.

The heat treatment section 2 is a unit including two heating elements. The heat treatment section 2 heats the sheet S to erase the image formed on the sheet S (ACT 4). At this point, the processor 801 acquires the imaging data of the front side and the rear side stored in the memory 802 and determines, from the imaging data, whether the image is formed on both the surfaces and, if the image is formed on one surface, on which surface the image is formed. The heat treatment section 2 heats one or both of the two heating elements according to a result of the determination and erases the image formed on the front side, the rear side, or both the surfaces of the sheet S.

The sheet S, from which the image is erased, is conveyed to the idle conveying section 3 and rotated in a direction of an arrow 3 shown in FIG. 1 to be cooled (ACT 5). The operations of the idle conveying section 3 are collectively explained later. If the sheet S is rotated by the idle conveying section 3 a plural number of times, the processor 801 controls the switching guide 21C such that the distal end of the switching guide 21C moves in the upward direction and controls the switching guide 21D such that the distal end of the switching guide 21D moves in the lateral direction. The distal end of the switching guide 21D faces the upward direction, whereby the cooled sheet S is conveyed in a direction of an arrow 4.

The processor 801 acquires the imaging data stored in the memory 802 and determines whether a staple trace is present on the imaging data (ACT 5). The determination processing may be performed any time after the imaging data is imaged by the reading section 1.

If a staple trace is present, the processor 801 controls the switching guides 21E to 21G such that the sheet S is conveyed to the reuse tray 13A (ACT 7). Specifically, the processor 801 controls the switching guide 21E such that the distal end of the switching guide 21E faces the lateral direction.

If a staple trace is absent on the sheet S, to convey the sheet S to the reuse tray 13B, the processor 801 controls the switching guide 21E such that the distal end of the switching guide 21E faces the upward direction and controls the switching guide 21F such that the distal end of the switching guide 21F faces the lateral direction (ACT 8).

The sheet S is conveyed to the reuse trays 13A and 13B according to the switching control in ACT 8 and rotation control for a not-shown roller pair.

In the determination processing in ACT 6, the processor 801 may determine, using the imaging data, whether the sheet S is deteriorated, for example, bent or torn and, if the sheet S is deteriorated, control the switching guide 21E to 21G to convey the sheet S to the disposal tray 13C. As a specific example of the switching, the processor 801 controls the switching guides 21E and 21F such that the distal ends of the switching guides 21E and 21F face the upward direction and controls the switching guide 21G such that the distal end of the switching guide 21G faces the downward direction.

Subsequently, operations performed when the image processing apparatus 100 prints sheets diverted to the reuse trays 13A and 13B are explained with reference to FIG. 3.

First, the user designates a mode during printing on the control panel 803. The designation of a mode is distinction concerning whether sheets after printing are stapled.

The processor 801 determines, by acquiring the mode, setting information concerning whether stapling is designated (ACT 11). If stapling is not designated (No in ACT 11), the processor 801 performs control such that a sheet is fed from the reuse tray 13A (ACT 12).

On the other hand, if stapling is designated (Yes in ACT 11), the processor 801 performs control such that a sheet is fed from reuse tray 13B or the tray for new sheets (not shown) (ACT 13).

The sheet fed from any one of the trays is conveyed in a direction of an arrow 6 through a conveying path indicated by an arrow 5 shown in FIG. 1 according to switching control for the switching guide 21H (the distal end of the switching guide 21H faces the lateral direction). Thereafter, images are formed on the sheet with respective color toners E1 to E4 (cyan, magenta, yellow, and black) of the printing section 12 and the sheet is output to a carry-out tray Tr.

In the above explanation, in order to unify the positions of staple traces of sheets conveyed to the reuse tray 13A, the user adjusts the direction of the sheets beforehand. As another example, if the image processing apparatus 100 includes a mechanism for reversing the direction of a sheet shown in FIG. 5, the sheet reversing mechanism may reverse the sheets to set staple traces in the same position (to be conveyed through a conveying path indicated by an arrow 2 shown in FIG. 5) and store the sheets in the reuse tray 13A.

This processing is explained below. The processor 801 specifies a position of a staple from imaging data and, if the position is a reversed position (e.g., lower left end) of a predetermined position (e.g., upper left end), causes the sheet reversing mechanism to reverse the sheet, and stores the sheet in the reuse tray 13A.

The image processing apparatus according to this embodiment conveys a reuse sheet to a different tray according to presence or absence of a staple trace. If a staple is attached during printing, the image processing apparatus according to this embodiment feeds a sheet from a tray for sheets not having staple traces. If a staple is not attached, the image processing apparatus feeds a sheet from a tray for sheets having staple traces. This makes it possible to divert a sheet according to presence or absence of a staple trace and feed a sheet according to presence or absence of staple setting during printing. Therefore, it is possible to suppress occurrence of a jam.

Second Embodiment

In a second embodiment, an implementation example in which a designated position of a staple is also taken into account in an operation during printing is explained. Diagrams of an image processing apparatus and an operation of diverting processing for a sheet are the same as those in the first embodiment. Therefore, explanation of the diagrams and the operation is omitted (see FIGS. 1 and 2).

In the second embodiment, during printing, in addition to distinction concerning whether sheets are stapled, if stapling is performed, the position of a staple can be designated.

Figure 6:
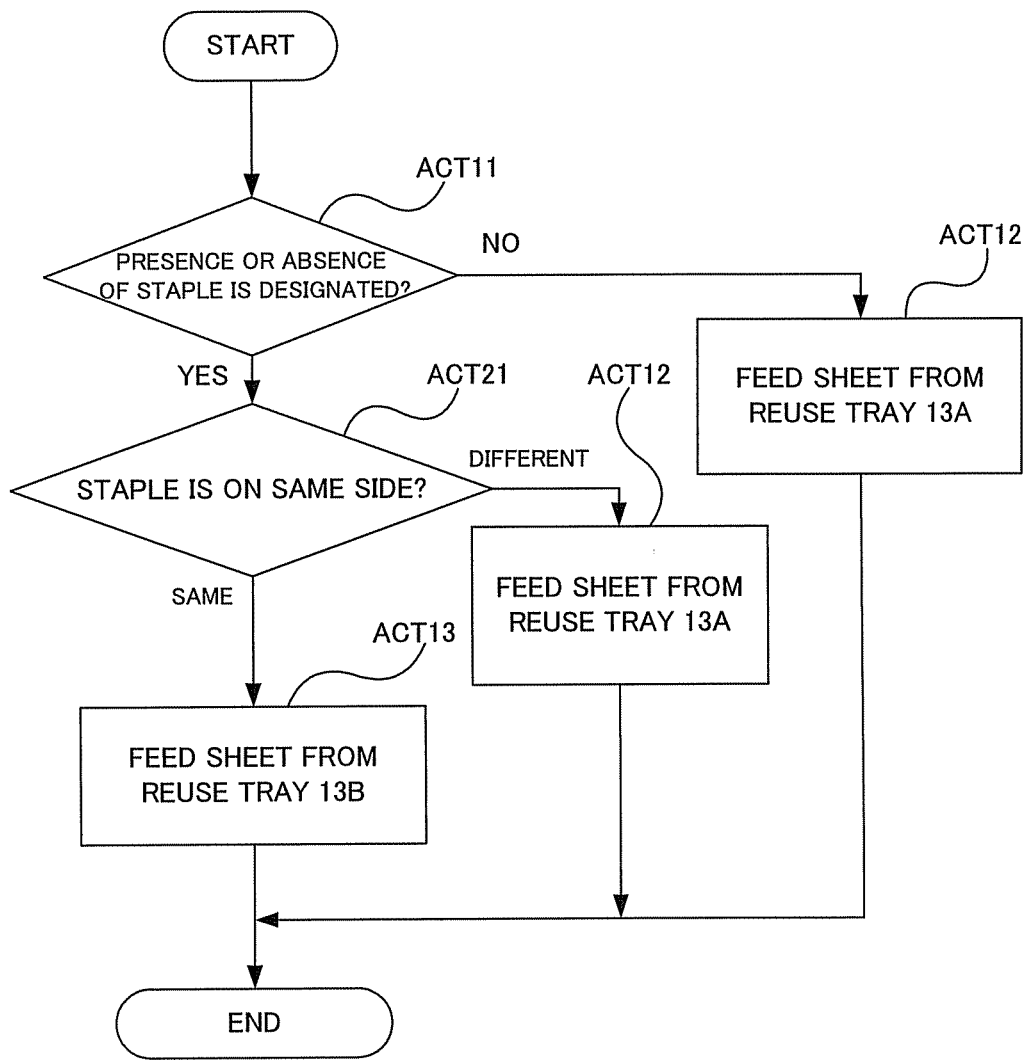
FIG. 6 is a flowchart for explaining an operation example during printing in a second embodiment.

Operations during printing in the second embodiment are explained with reference to a flowchart of FIG. 6. Reference signs same as those in FIG. 3 denote acts same as those in the first embodiment. Therefore, detailed explanation of the acts is omitted.

If stapling is designated (Yes in ACT 11), the processor 801 determines whether a position same as the position of staple traces of sheets accumulated in the reuses tray 13A (a tray in which sheets that cannot be stapled during the next printing are stored) is designated (ACT 21). As explained with reference to FIGS. 4 and 5 in the first embodiment, during erasing, a user adjusts the positions of the staples to be the same or the sheet reversing mechanism performs the reversing processing. Therefore, staple traces of the respective sheets stored in the reuse tray 13A are in the same position. Consequently, the processor 801 can specify a staple position of the sheets in the reuse tray 13A.

If the same position is not designated (No in ACT 21), the processor 801 performs control such that a sheet is fed from the reuse tray 13A (ACT 12).

On the other hand, if the same position is designated (Yes in ACT 21), the processor 801 performs control such that a sheet is fed from the reuse tray 13B (a tray in which sheets that can be stapled during the next printing are stored) or the tray for new sheets (not shown) (ACT 13).

If stapling is not designated in the determination of ACT 11 (No in ACT 11), a sheet is fed from the reuse tray 13A in the same manner as in the first embodiment (ACT 12).

In this embodiment, it is possible to increase use of sheets that cannot be stapled stored in the reuse tray 13A, i.e., sheets having staple traces compared with the first embodiment. Therefore, a reuse ratio of sheets is improved.

Third Embodiment

On a sheet surface, ultra fine unevenness (paper pattern), which can be viewed using a microscope or the like, caused by, for example, a combination of pulp is present. The paper pattern is different depending on a sheet. The sheet can be specified by the paper pattern.

In the third embodiment, the paper pattern is read by a reading section and the number of times of erasing and a staple position are managed in association with the paper pattern to divert sheets more in detail. Since a hardware configuration is the same as that in the first embodiment, explanation of the hardware configuration is omitted (see FIG. 1).

Figure 7:
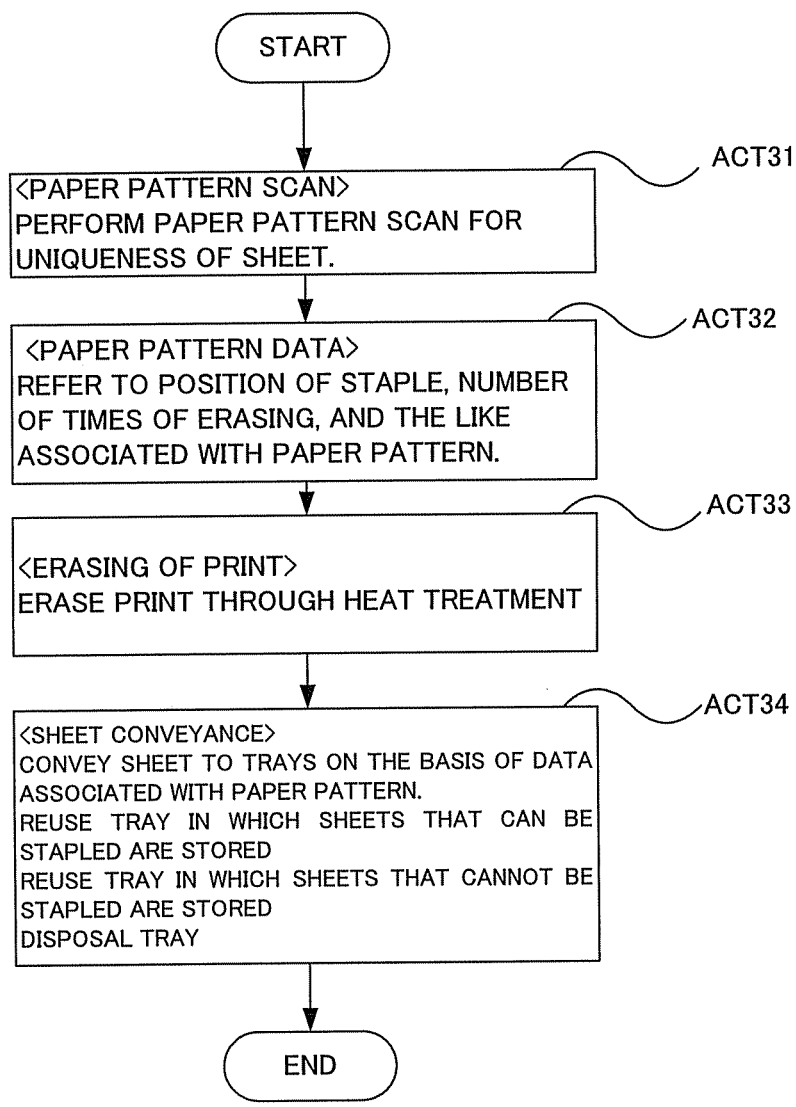
FIG. 7 is a flowchart for explaining an operation example during erasing in a third embodiment.

A diverting operation in the third embodiment is explained with reference to FIG. 7. It is assumed that the paper feeding processing from the ADF 11 and the switching processing for the conveying path in ACTS 1 and 2 explained in the first embodiment are already performed (see FIG. 2).

Figure 8:
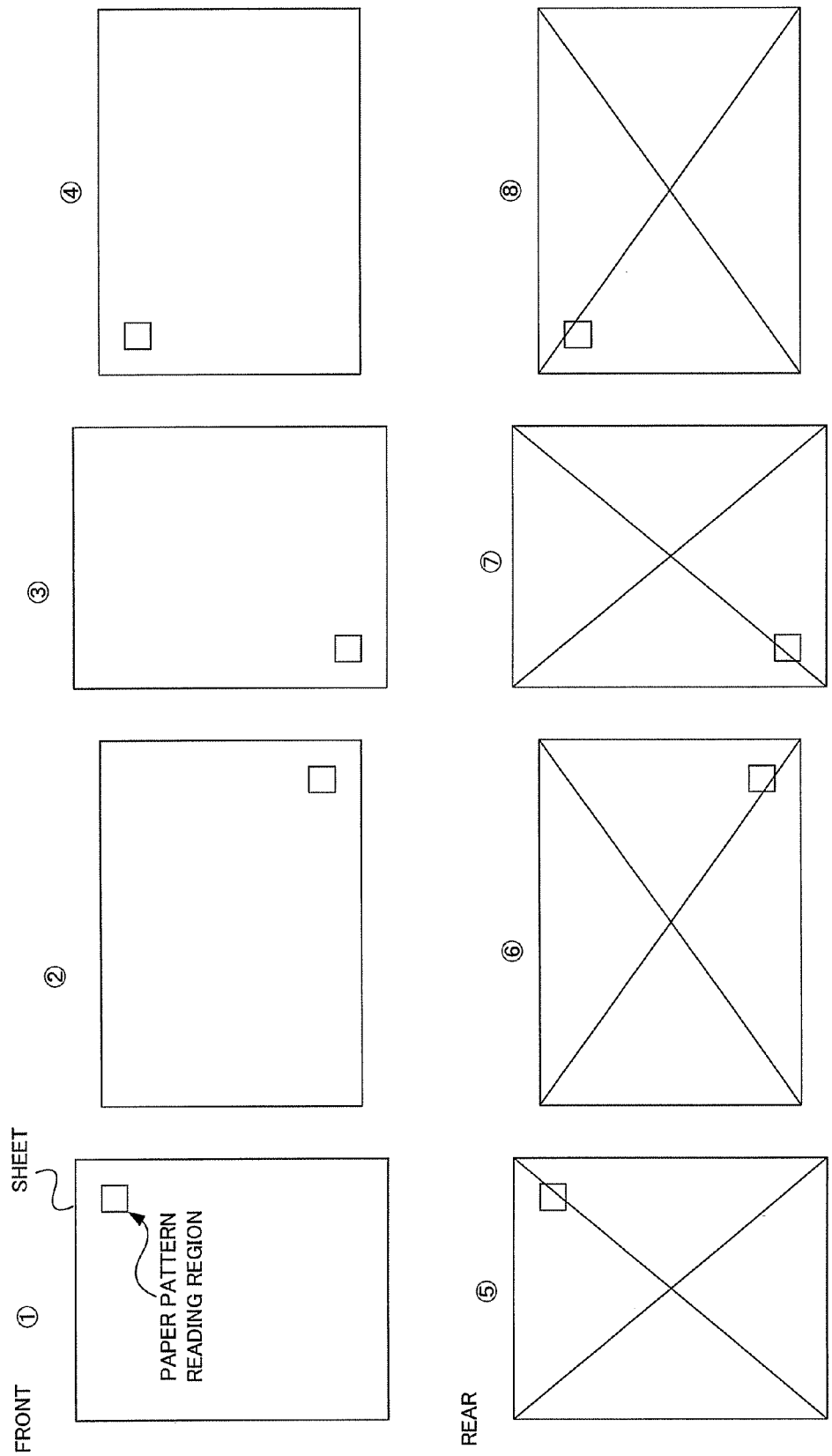
FIG. 8 is a diagram of an example of a region where an image processing apparatus according to the third embodiment detects a paper pattern.

The reading section 1 scans the front side and the rear side of the sheet S and causes the memory 802 to store image data. At this point, paper patterns are simultaneously read. The processor 801 acquires paper patterns in specified positions of the front side and the rear side of the sheet S from the stored image data (ACT 31). Examples of regions (specified positions) where paper patterns are read are shown in FIG. 8. In this embodiment, positions where image formation is not usually performed are set as paper pattern reading regions. As shown in FIG. 8, rectangular regions near the corners of the front side and the rear side of a sheet are set as paper pattern reading targets. The processor 801 may read plural regions or all regions of the regions shown in FIG. 8 or may read one region of each of the front side and the rear side.

The processor 801 determines whether a staple trace is present on the sheet S. If a staple trace is present, the processor 801 specifies the position of the staple trace.

Figure 9A:
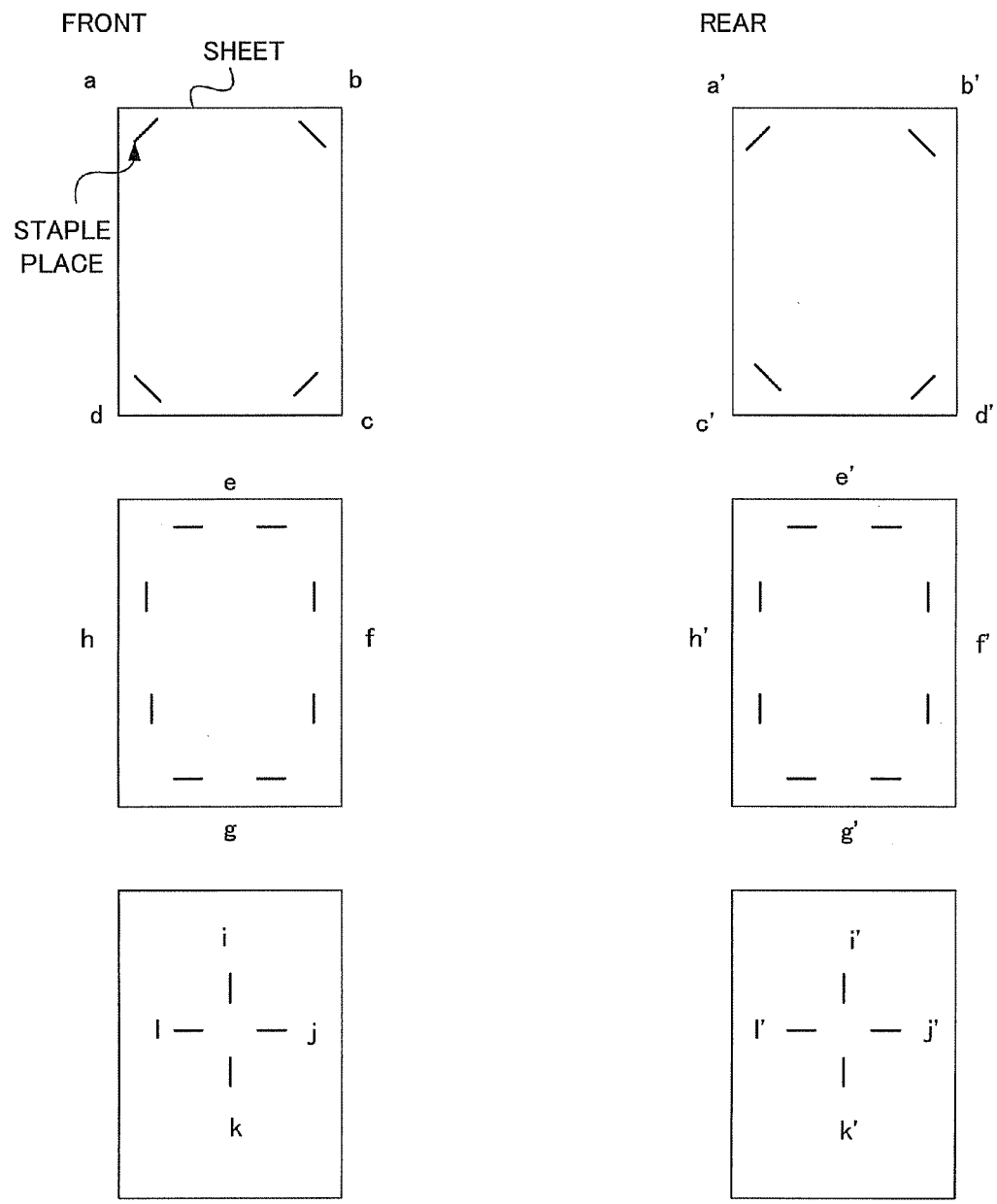
FIG. 9A is a diagram of examples of the positions of staples.
Figure 9B:
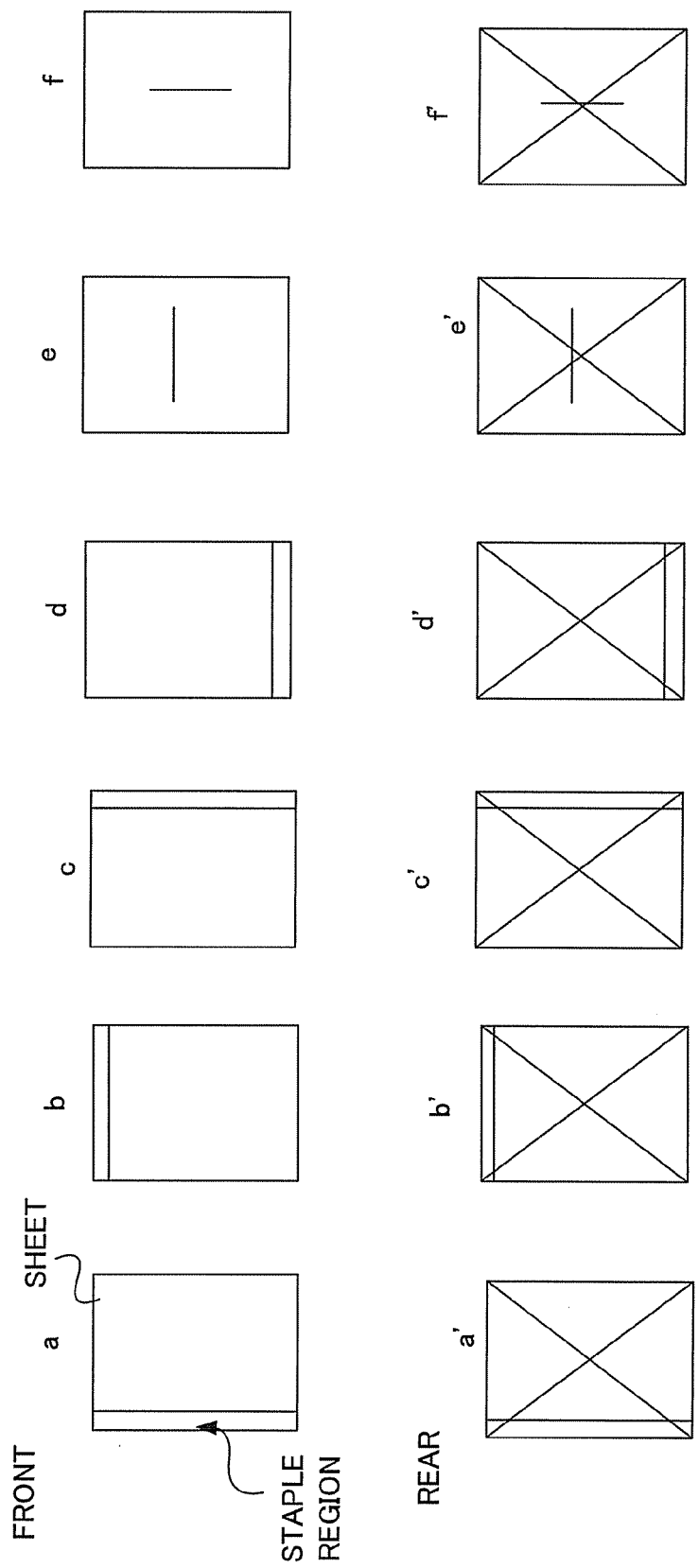
FIG. 9B is a diagram of examples of the positions of staples in each of regions.

Examples of specified positions of staples are shown in FIGS. 9A and 9B. First, pattern examples of places of staples are shown in FIG. 9A. In this embodiment, as shown in FIG. 9A, data corresponding to positions indicating that, for example, the upper left end of the front side has a value "a" and two points at the left end of the front side have a value "h" is stored in the memory 802. In management information explained later, staple positions are managed using the values (stored in association with the values). In this embodiment, the staple positions are managed using regions on a sheet as well. Pattern examples of staple regions are shown in FIG. 9B. Like the patterns of the places of the stales, as patterns of the staple regions, data corresponding to the positions of regions indicating, for example, a left end region of the front side has a value "a" and a lateral direction region in the center of the rear side has a value "e'" is stored in the memory 802. In the management information explained later, staple positions are managed using the values.

Both of the places of the staples and the staple regions may be managed or one of the places of the staples and the staple regions may be managed. FIGS. 8, 9A, and 9B are only examples and forms of management are not limited to these figures.

Thereafter, the processor 801 acquires, referring to management information of a sheet stored in the memory 802 in advance using paper pattern information acquired in ACT 31, the number of times of erasing for the sheet and position information of staples in the management information (ACT 32).

An example of the management information of the sheet is shown in FIG. 10. In the memory 802, for each of the front side and the rear side of the sheet, management information in which paper pattern information, the number of times erasing for the sheet is performed, and the number of times of attachment of staples are associated with one another is stored. The number of times of attachment of staples is stored for each of stapled places and regions on the sheet. The processor 801 determines whether information coinciding with the paper pattern information read in ACT 31 is present in the management information. If the information is present, the processor 801 acquires the number of times of erasing and thereafter increases the number of times of erasing by one. The processor 801 acquires the number of times of stapling corresponding to the position information of the staples specified from the imaging data. Thereafter, if the number of staple traces of the imaging data increases from a value in the management information, the processor 801 updates the value in the management information for each of positions such that the number of staple traces and the value coincide with each other.

If information coinciding with the paper pattern information read in ACT 31 is absent in the management information, the information is registered anew.

The heat treatment section 2 heats the sheet S to erase an image formed on the sheet S (ACT 33). At this point, the image formed on the front side, the rear side, or both the surface is erased by control same as the control in the first embodiment.

The sheet S, from which the image is erased, is conveyed to the idle conveying section 3 and cooled in the same manner as in the first embodiment.

The processor 801 diverts the sheet S to a conveying destination tray on the basis of the number of times of erasing, the number of times of stapling, and the stapling position acquired in ACT 32 (ACT 34). The diverting in ACT 34 is explained below.

If the number of times of erasing for the sheet S exceeds a specified value (e.g., ten times), the processor 801 performs control to convey the sheet S to the disposal tray 13C.

The processor 801 acquires the number of times of stapling from the management information using paper pattern information of the sheet S read by the reading section 1 and the position of a staple drawn on the image data. If the acquired number of times of stapling in the same place or the same region exceeds a specified value (e.g., three times), the processor 801 conveys the sheet S to the reuse tray 13A (in which sheets for which staples cannot be used during the next printing are stored). If the number of times of stapling does not exceed the specified value, the processor 801 controls the operation of the switching guides 21E to 21G such that a sheet is conveyed to the reuse tray 13B in which sheets for which staples can be used during the next printing are stored.

If a staple trace is present, the position of the staple trace may be an element for the diversion determination. For example, if a staple trace is present in the center of the sheet S, since it is difficult to reuse the sheet S, the processor 801 performs control to convey the sheet S to the disposal tray 13C. If staple traces are present in both a left side region and a right side region of the sheet S, it is possible to reuse the sheet S but it is difficult to staple the sheet S. Therefore, the processor 801 may perform control to convey the sheet S to the reuse tray 13A. The determination and the control based on the position of the staple trace can be applied to the first and second embodiments as well.

In general, a staple is often attached to the upper left end of a sheet. Therefore, if the staple trace is present at the upper left end of the sheet S, the processor 801 may perform control to set the staple trace at the lower left end of the sheet S using the sheet reversing mechanism shown in FIG. 5 and convey the sheet S to the reuse tray 13B in which sheets for which staples can be used during the next printing are stored.

In the example explained above, the implementation for diverting a sheet to any one of the three trays, i.e., the reuse tray 13A in which sheets for which staples cannot be used during the next printing are stored, the reuse tray 13B in which sheets for which staples can be used during the next printing are stored, and the disposal tray 13C is explained. An implementation example for diverting a sheet taking into account an arrangement direction (a longitudinal direction or a lateral direction) of a sheet in the ADF 11 and the position of a staple is explained with reference to FIG. 11.

Figure 11:
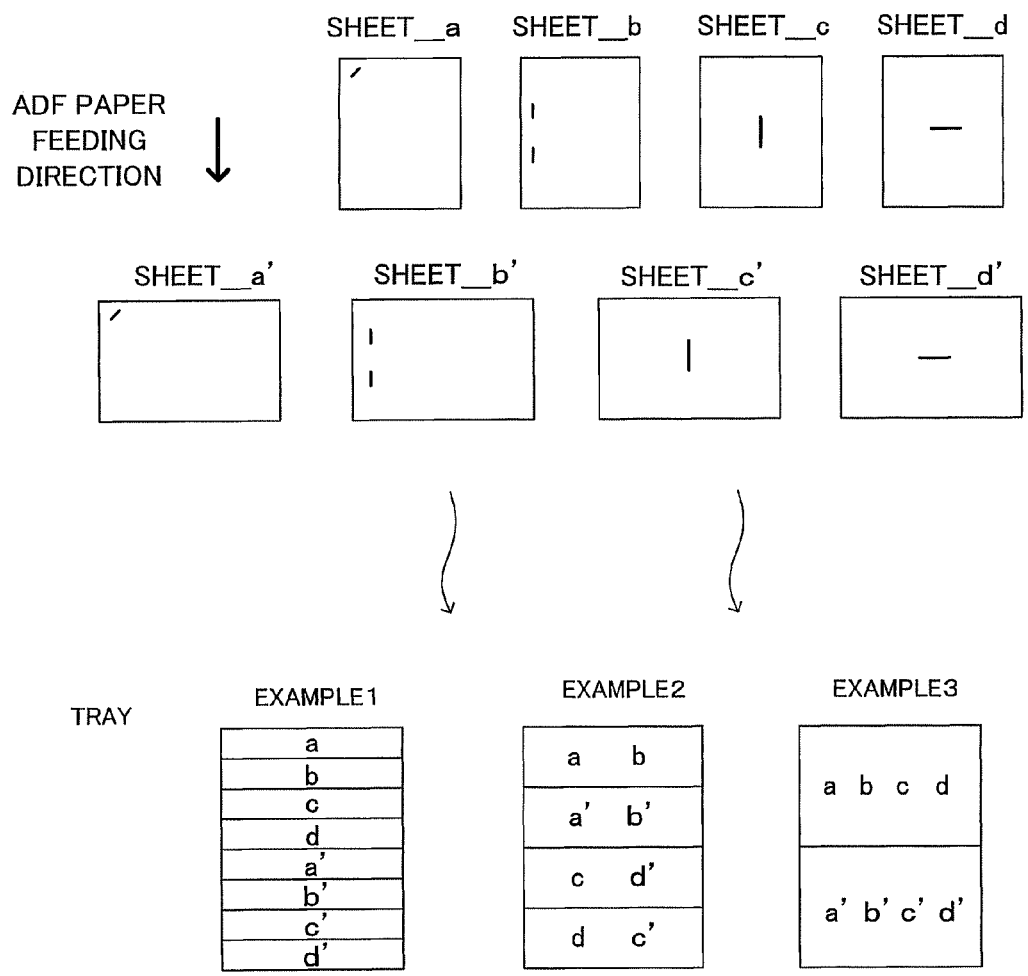
FIG. 11 is a diagram of an example of a sheet diverting method according to the position of a staple in the third embodiment.

Examples of sheet directions and the positions of staples are shown in an upper part of FIG. 11. A sheet _a is a sheet arranged in the longitudinal direction in the ADF 11. A staple trace is present at the upper left end of the sheet _a. Similarly, a staple trace is present on the left side of a sheet _b, a staple trace is vertically present in the center of a sheet _c, and a staple trace is laterally present in the center of a sheet _d (the sheets _a to _d are also arranged in the longitudinal direction). Sheets a' to d' indicate examples of sheet directions and the positions of staples in the case in which the sheets _a to _d are placed laterally.

An example 1 shown FIG. 11 is an example in which the sheets are diverted to separate trays. An example 2 is an example in which the sheets are diverted according to the positions of staples with the directions of the sheets adjusted in the longitudinal and lateral directions.

In the example 2, if the sheets _a and _b are arranged in the longitudinal direction, since the staple traces are present on the left side, the sheets _a and _b are diverted to the same tray. Similarly, if the sheets _a' and _b' are arranged in the longitudinal direction, since the staple traces are present on the upper side (or the lower side), the sheets _a' and _b' are diverted to the same tray. If the sheets _c and _d' are arranged in the same direction, since the staple positions are the same, the sheets _c and _d' are diverted to the same tray. The sheets _d and _c' are diverted in the same manner. The example 2 shown in FIG. 11 can be applied to adjustment by the user in arranging a sheet on the ADF 11 and can be applied when the sheet reversing mechanism shown in FIG. 5 or a sheet direction changing mechanism is present.

An example 3 shown in FIG. 11 is an example in which a sheet is diverted with attention paid only to the direction of the sheet. An implementation of the example 3 may be adopted.

Figure 12:
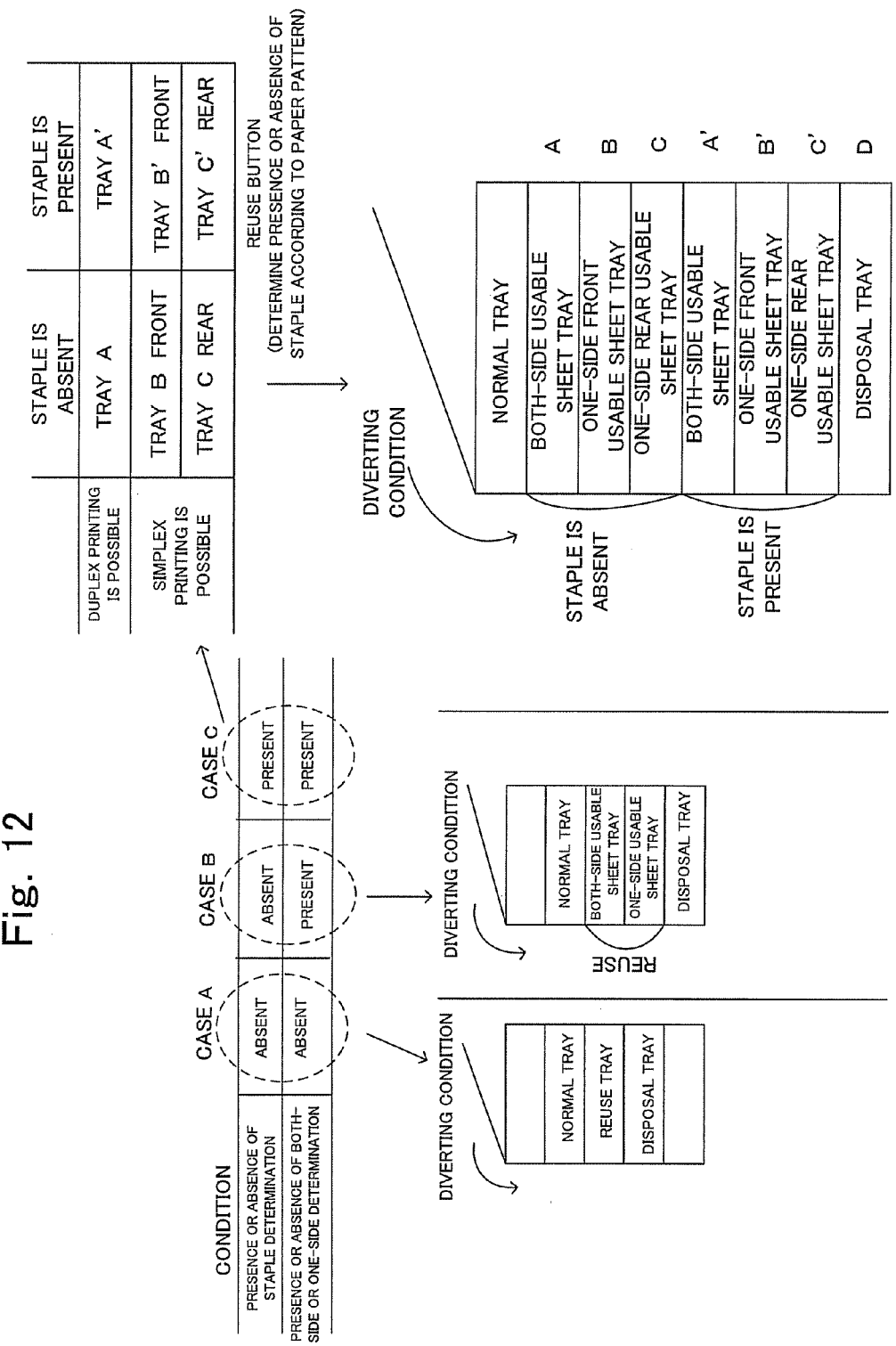
FIG. 12 is a diagram for explaining a sheet diverting method according to presence or absence of staple determination and presence or absence of both-side or one-side determination of the image processing apparatus according to the third embodiment.

FIG. 12 is a diagram of another diverting method. The diverting method is an example in which a sheet is diverted according to mode switching for enabling determination of presence or absence of a staple trace or enabling both-side or one-side determination.

If a mode for disabling the determination of presence or absence of a staple trace and the both-side or one-side determination is selected (a case A), the processor 801 sorts sheets into two patterns of "reuse" and "disposal". In this case, three trays, that is, a normal tray in which new sheets are stored, a reuse tray in which sheets subjected to erasing are stored, and a disposal tray in which sheets for disposal are stored only have to be provided.

If a mode for disabling the determination of presence or absence of a staple trace and enabling the both-side or one-side determination is selected (a case B), the processor 801 sorts sheets into three patterns of "a reuse sheet for which simplex printing is possible", "a reuse sheet for which duplex printing is possible", and "disposal" and stores the sheets in trays separately from one another. In this case, a normal tray, a disposal tray, a reuse tray for sheets usable on one side, and a reuse tray for sheets usable on both sides only have to be provided. When sheets are stored in the reuse tray for sheets that can be used for simplex printing, the processor 801 stores the sheets by reversing sheet surfaces using the sheet reversing mechanism shown in FIG. 5 to unify printable surfaces.

If a mode for enabling the determination of presence or absence of a staple trace and enabling the both-side or one-side determination is selected (a case C), the processor 801 distinguishes whether both sides of a sheet can be reused or one side of the sheet can be reused and determines, for each distinguished sheet, whether a staple trace is present. If a determination result of the processor 801 indicates a sheet reusable on both sides and having no staple trace, the sheet is stored in a tray A. If the determination result of the processor 801 indicates a sheet reusable on both sides and having a staple trace, the sheet is stored in a tray A'. Concerning a sheet reusable on one side, the processor 801 further determines which of the front side and the rear side can be reused. In this example, a sheet not having a staple trace and reusable on the front side is stored in a tray B. A sheet having a stable trace and reusable on the front side is stored in a tray B'. A sheet not having a staple trace and reusable on the rear side is stored in a tray C. A sheet having a staple trace and reusable on the rear side is stored in a tray C'.

Figure 5:
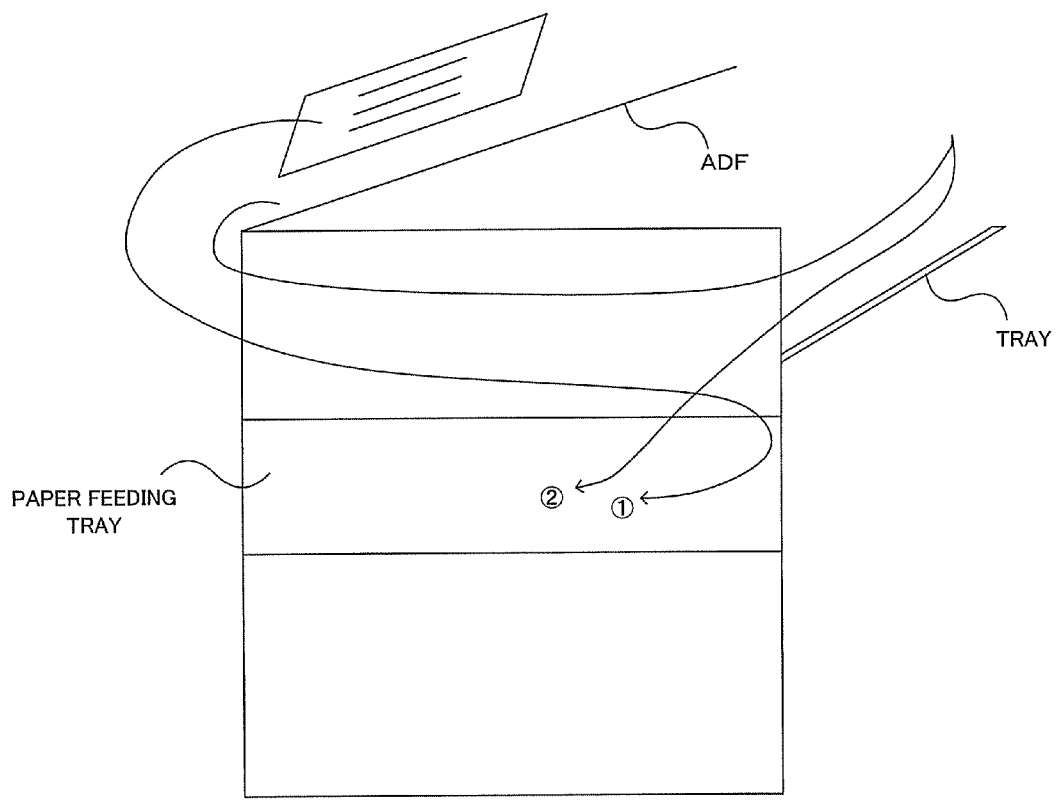
FIG. 5 is a diagram for explaining an operation for switching the direction of the front side and the rear side of the sheet by the image processing apparatus.

If the image processing apparatus 100 includes the sheet reversing mechanism shown in FIG. 5 as explained above in the case C, since a sheet surface is reversed, the trays B and C can be consolidated as one tray and the trays B' and C' can be consolidated as one tray.

If sheets are sorted as indicated by the example 1 and the example 2 shown in FIG. 11, the second embodiment can be applied to the operation of the image processing apparatus 100 during printing. Therefore, explanation of the operation is omitted (see FIG. 5).

Explanation of the Idle Cooling Section 3

Details of the idle cooling section 3 explained in the first to third embodiments are explained. The purpose of the cooling is, for example, as explained below.

If hot sheets are stored in a tray as they are, a toner, ink, or the like tends to stick between the sheets.

If the sheet remains hot, the sheets tend to curl (curve) and cause a jam.

It is possible to save cost of the image processing apparatus and electrical utility expenses by cooling a sheet in the conveying path without using an apparatus.

The idle cooling section 3 can select a method of cooling according to a type of a sheet such as size and thickness and suppress power consumption. For example, methods of cooling are as explained below.

In the case of a large sheet, the idle cooling section 3 is rotated at high speed and a large number of revolutions in the conveying path to cool the sheet.

In the case of a thin sheet, the idle cooling section 3 is rotated at high speed and a small number of revolutions in the conveying path to cool the sheet.

In the case of a thick sheet, the idle cooling section 3 is rotated at low speed and a large number of revolutions in the conveying path to cool the sheet.

In the case of a small sheet, the idle cooling section 3 is rotated at low speed and a small number of revolutions in the conveying path to cool the sheet.

Since the image processing apparatus includes the idle cooling section 3, a sheet can immediately change to a reusable state.

Figure 13:
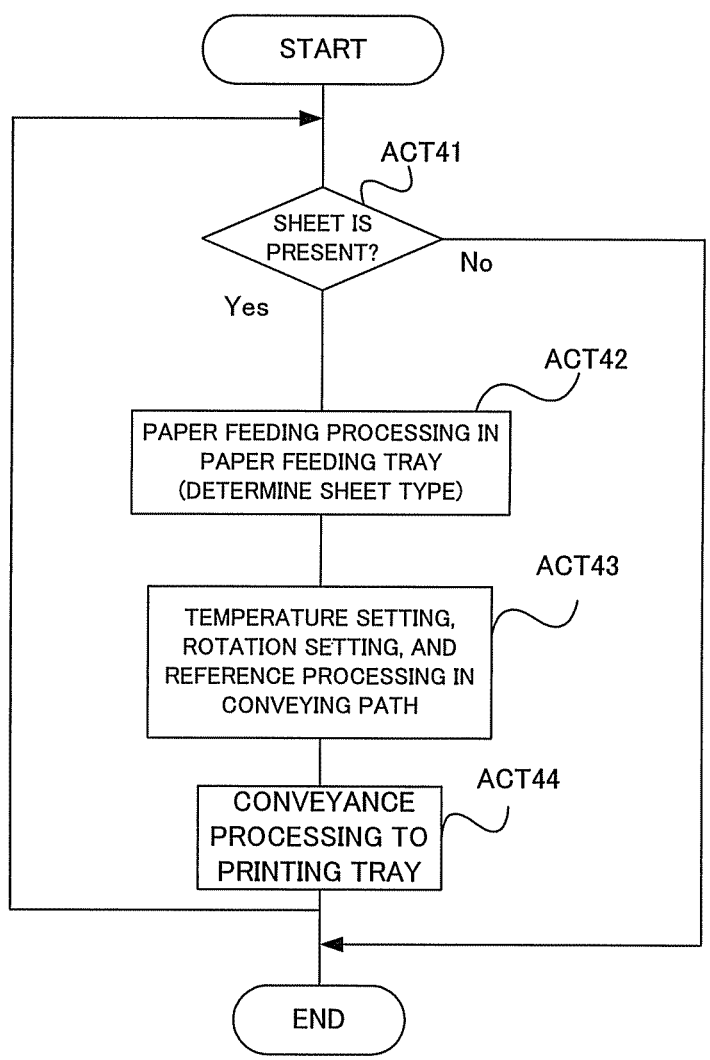
FIG. 13 is a flowchart for explaining an operation example of the image processing apparatus according to the third embodiment in cooling a sheet.

An operation example of the image processing apparatus according to the embodiments is explained below with reference to a flowchart of FIG. 13.

The user sets a printed sheet on the ADF 11 of the image processing apparatus 100. A form of setting the printed sheet is not limited. The printed sheet may be set on an external tray.

The user presses the reuse button of the control panel 803.

The ADF 11 detects that the printed sheet is set (Yes in ACT 41) and feeds the set printed sheet (ACT 42). When feeding the sheet, the ADF 11 determines a type of the sheet.

Subsequently, the processor 801 performs temperature setting for the heat treatment section 2, rotation setting for the idle cooling section 3, or reference setting according to the sheet type (ACT 43). Three processing examples of ACT 43 are separately explained below.

As a first example, processing performed if the sheet is determined as a normal sheet by the ADF 11 is explained. The heat treatment section 2 heats the sheet in the conveying path at predetermined temperature and predetermined conveying speed. Consequently, an image printed on the sheet is erased. The idle cooling section 3 cools the sheet in the conveying path (the conveying path indicated by the arrow 3 shown in FIG. 1) at a predetermined number of revolutions and predetermined conveying speed.

As a second example, processing performed if the sheet is determined as a large sheet by the ADF 11 is explained. The heat treatment section 2 heats the sheet in the conveying path at predetermined temperature (temperature higher than the temperature for the normal sheet) and predetermined conveying speed (speed higher than the conveying speed for the normal sheet). The idle cooling section 3 cools the sheet in the conveying path at a predetermined number of revolutions (the number of revolutions larger than the number of revolutions for the normal sheet) and predetermined conveying speed (speed higher than the conveying speed for the normal sheet).

As a third example, processing performed if the sheet is determined as a small sheet by the ADF 11 is explained. The heating treatment section 2 heats the sheet in the conveying path at predetermined temperature (temperature lower than the temperature for the normal sheet) and predetermined conveying speed (speed lower than the conveying speed for the normal sheet). The idle cooling section 3 cools the sheet in the conveying path at a predetermined number of revolutions (the number of revolutions smaller than the number of revolutions for the normal sheet) and predetermined conveying speed (speed lower than the conveying speed for the normal sheet).

Consequently, the sheet can be reused.

The cooled sheet is conveyed to a predetermined tray (ACT 44) and immediately changes to a re-printable state.

The user can designate a type of a sheet. FIG. 14 is a flowchart for explaining an example of a setting operation in cooling the sheet. First, a cooling selection screen is displayed on the control panel 803 (ACT 51). On this screen, rotating speed and conveying speed are selected (ACTS 52 to 56). If the rotating speed and the conveying speed are determined (Yes in ACTS 52 to 56), temperature setting processing is performed in the conveying path (the arrow 2 shown in FIG. 1) (ACT 53). If the rotating speed and the conveying speed are not determined (No in ACTS 52 to 56), error display is performed (ACT 57).

The data explained in the first to third embodiments are explained as being stored in the memory 802. However, the data may be stored in an external storage device or a server. In the first to third embodiments, the staples are referred to. However, the embodiments can be applied to hole punch and the like as well.

As explained in detail above, according to the technique described in this specification, a sheet to be reused can be diverted and stored in a tray according to presence or absence of a staple trace. Therefore, it is possible to facilitate reuse of the sheet.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the spirit of the inventions. The accompanying claims and their equivalents are intended to cover such forms or modifications as would fall within the scope and spirit of the inventions.

What is claimed is:

1. An image processing apparatus comprising:
   plural trays;
   a reading section configured to convert an image formed on a sheet into image data and cause a storing section to store the image data;
   an erasing section configured to erase the image formed on the sheet; and
   a control section configured to acquire the image data from the storing section, determine, using the image data, whether a trace of a staple is present on the sheet, and convey the sheet, from which the image is erased by the erasing section, to any one of the plural trays such that a conveying destination is different according to a determination result.

2. The apparatus according to claim 1, wherein, if the control section determines that a trace of a staple is present on the sheet, the control section performs control to convey the sheet, from which the image is erased by the erasing section, to a first tray among the plural trays and, if the control section determines that a trace of a staple is absent, the control section performs control to convey the sheet, from which the image is erased, to a second tray different from the first tray.

3. The apparatus according to claim 2, where the control section further acquires, if printing processing is performed by reusing the sheet, setting information concerning whether a staple is attached to the sheet after printing and, if the setting information is information indicating that a staple is attached, performs control to feed a sheet from the second tray.

4. The apparatus according to claim 3, wherein, if the setting information is information indicating that a staple is not attached, the control section performs control to feed a sheet from the first tray or a tray in which new sheets are stored.

5. The apparatus according to claim 3, wherein the control section further acquires the setting information and information concerning a position where a staple is attached and, if the setting information is information indicating that a staple is attached and the position information and a position of a staple trace of a sheet stored in the first tray are different, performs control to feed a sheet from the first tray.

6. The apparatus according to claim 5, wherein, if the setting information is information indicating that a staple is attached and the position information and the position of the staple trace of the sheet stored in the first tray are the same, the control section performs control to feed a sheet from the second tray or a tray in which new sheets are stored.

7. The apparatus according to claim 2, further comprising a sheet reversing mechanism configured to reverse a surface of a sheet, wherein
   the control further specifies, if a trace of a staple is present, a position of the staple trace from the image data and, if the specified position is a reversed position of a predetermined position, after the sheet reversing mechanism reverses the sheet, conveys the sheet to the first tray.

8. The apparatus according to claim 1, wherein the control section further acquires the image data from the storing section, acquires a paper pattern of a predetermined region of the image data, and conveys the sheet, from which the image is erased by the erasing section, to any one of the plural trays on the basis of information concerning the paper pattern.

9. The apparatus according to claim 8, wherein
   the control section causes the storing section to store in advance a table in which paper pattern information and a number of times of erasing for a sheet are associated with each other, retrieves, from the table, paper pattern information same as paper pattern information of a sheet read by the reading section, acquires a number of times of erasing of the paper pattern information, and, if the number of times of erasing exceeds a predetermined value, conveys the sheet to a tray for disposal among the plural trays.

10. The apparatus according to claim 8, wherein
    the control section further causes the storing section to store in advance a table in which paper pattern information and a number of times of stapling counted for each position in a sheet are associated with each other, acquires the number of times of stapling from the table using paper pattern information of a sheet read by the reading section and a position of a staple trace drawn on the image data, if the number of times of stapling exceeds a specified value, conveys the sheet to a first tray in which sheets for which a staple cannot be used during next printing are stored, and, if the number of times of stapling does not exceed the specified value, conveys the sheet to a second tray in which sheets for which a staple can be used during the next printing are stored.

11. The apparatus according to claim 1, wherein, if the control section further determines that a trace of a staple is present on the sheet, the control section specifies a position of a staple trace drawn on the image data and performs control to convey the sheet to any one of the plural tray according to the position.

12. The apparatus according to claim 1, wherein
    the reading section reads a front side and a rear side of a sheet and causes the storing section to store image data of the front side and the rear side,
    the control section further determines, using the image data of the front side and the rear side stored in the storing section, on which side of the sheet an image is formed, and
    the erasing section erases, on the basis of a determination result of the control section, the image on one of the front side and the rear side or both the sides.

13. A method of diverting sheets via an image processing apparatus, the method comprising:
    converting an image formed on a sheet into image data and causing a storing section to store the image data;
    erasing the image formed on the sheet; and
    acquiring the image data from the storing section, determining, using the image data, whether a trace of a staple is present on the sheet, and conveying the sheet, from which the image is erased, to any one of plural trays such that a conveying destination is different according to a determination result.

14. The method according to claim 13, wherein, if a trace of a staple is present on the sheet, conveying the sheet, from which the image is erased, to a first tray among the plural trays and, if a trace of a staple is absent, conveying the sheet, from which the image is erased, to a second tray different from the first tray.

15. The method according to claim 14, further acquiring, if printing processing is performed by reusing the sheet, setting information concerning whether a staple is attached to the sheet after printing and, if the setting information is information indicating that a staple is attached, feeding a sheet from the second tray.

16. The method according to claim 15, wherein, if the setting information is information indicating that a staple is not attached, feeding a sheet from the first tray or a tray in which new sheets are stored.

17. The method according to claim 15, further acquiring the setting information and information concerning a position where a staple is attached and, if the setting information is information indicating that a staple is attached and the position information and a position of a staple trace of a sheet stored in the first tray are different, feeding a sheet from the first tray.

18. The method according to claim 17, wherein, if the setting information is information indicating that a staple is attached and the position information and the position of the staple trace of the sheet stored in the first tray are the same, feeding a sheet from the second tray or a tray in which new sheets are stored.

19. The method according to claim 13, further acquiring the image data from the storing section, acquiring a paper pattern of a predetermined region of the image data, and conveying the sheet, from which the image is erased, to any one of the plural trays on the basis of information concerning the paper pattern.

20. The method according to claim 19, further causing the storing section to store in advance a table in which paper pattern information and a number of times of erasing for a sheet are associated with each other, retrieving, from the table, paper pattern information same as paper pattern information of a sheet read, acquiring a number of times of erasing of the paper pattern information, and, if the number of times of erasing exceeds a predetermined value, conveying the sheet to a tray for disposal among the plural trays.

* * * * *